March 3, 1970     H. LEIBER     3,498,422

SIGNALLING MEANS FOR A BRAKE CONTROL SYSTEM

Filed Feb. 16, 1968

INVENTOR.
Heinz Leiber

BY *Spencer & Kaye*
ATTORNEYS

United States Patent Office 3,498,422
Patented Mar. 3, 1970

3,498,422
SIGNALLING MEANS FOR A BRAKE
CONTROL SYSTEM
Heinz Leiber, Leimen, Germany, assignor to TELDIX
Gesellschaft mit beschrankter Haftung
Filed Feb. 16, 1968, Ser. No. 706,182
Claims priority, application Germany, Feb. 16, 1967,
T 33,220
Int. Cl. B60t 8/16
U.S. Cl. 188—181                                    12 Claims

ABSTRACT OF THE DISCLOSURE

A coupling device permitting the signaling means of a brake control system to be attached to a wheeled vehicle to sense the condition of motion of one of the vehicle wheels. The coupling device inculdes a friction wheel mounted on an axle in the signaling device and arranged to roll on a portion of the friction surface of the brake assembly of the particular vehicle wheel.

CROSS-REFERENCE TO RELATED APPLICATION

The subject matter of this application is related to that disclosed in a copending application Ser. No. 686,492, filed Nov. 29, 1967 of Heinz Leiber.

BACKGROUND OF THE INVENTION

The present invention relates to apparatus for controlling the braking force applied in the friction brakes of wheeled vehicles.

Brake control systems, wherein a condition of angular motion, such as rotational deceleration, of a vehicle wheel is detected by means of an electrical signaling device, and the braking force applied to the wheel correspondingly regulated have been previously proposed. The signaling devices used in these systems, which, for example, can comprise a spring-coupled flywheel and a mechanically operated electrical contact, are designated to be mechanically coupled with and driven by the wheel.

A number of means have been previously developed for transmitting information concerning the condition of rotational motion of a wheel to a signaling device. These means include various types of mechanisms for driving the signaling device at a rotational speed proportional to the rotational speed of the wheel.

One such coupling mechanism is disclosed in the German Utility Model Patent No. 1,890,102. Since this coupling mechanism requires that the wheel be connected to a drive shaft, however, it would not be useful in the cases where the braking force of a non-driven wheel is to be the subject of regulation.

Electrical signaling devices which are mounted directly on the wheel axle or hub are also known. These signaling devices, which permit control of the braking force on each individual wheel are disclosed, for example, in the article, "Entwicklung de Blockierverhüters für Fahrzeuge" of F. Ostwald, that appeared in Automobile Review, Bern (September 1964, p. 5, Figure 6) and in the German Auslegeschrift (DAS) No. 1,045,242. The latter publication discloses a D.C. generator serving as the signaling device. This type of "built-in" installation requires that each signaling device bet constructively adapted to fit a particular vehicle and that the signaling means be installed at the factory. A supplementary attachment or installation would be out of the question for most vehicles.

Non-electric brake control systems, as disclosed, for example, in the German Patent No. 759,521, are known which have a regulating device with a spring-mass system mounted on the wheel brake plate and driven by the wheel by means of a ring gear and a pinion. This type of drive mechanism also requires special construction of the wheel hub or axle and is not suitea to supplementary assembly with a brake control system attachment.

Finally a purely hydraulically or pneumatically operated brake control system for aircraft is also known in the art; this system has a rubber coated signalling device housing serving as a flywheel and running directly on the wheel rim or felly. This type of friction drive is disclosed, for example, in the prospectus of the Dunlap Rubber Co., Ltd., Aviation Division, Foleshill, Coventry, Reference No. B 417/3M/8/64, entitled "Rim-Mounted Maxaret." This type of drive however, is suited only for the intermittent operation which it receives when the aircraft in which it is installed is landing. If such a mechanism were incorporated in land vehicles the rim would soon become dirty, or, in winter, covered with frost causing an interuption in the drive connection. In addition, this type of drive likewise requires a special running groove in the rim or felly of the wheel.

SUMMARY OF THE INVENTION

An object of the present invention, therefore, is to provide means whereby the signaling device of a brake control system may be driven by the wheel of a vehicle such that it, together with the signal producing portion of the signaling device and the associated control system, may be installed in any type of vehicle at any time.

This as well as other objects which will become apparent in the discussion that follows are achieved, according to the present invention, by providing the signaling device with a friction drive wheel arranged to roll upon a portion of the friction surface of the brake assembly which comes in contact with the brake lining when the brake assembly is in its operative state.

This arrangement solves the problem of the contamination of the friction wheel running surface since the brake shoes keep the friction surface clean and dry, at least when the brake is operative. In addition, a simple friction wheel having a cylindrical or slightly cambered rim is suited for both disc as well as for drum brakes of all kinds. Since the diameters of the braking surfaces of motor vehicles which are designed to travel on streets vary, within the individual size classes, only inconsiderably, only a single type of signaling device is needed to fit a great number of different vehicles.

It is true that the friction surfaces of a brake assembly become very hot (up to 600° C.) when a braking force is applied to them. This fact will not be deleterious, however, if the friction wheel, or at least the running circumferential edge of the friction wheel, is made of the same material which has long been used successfully for brake linings. In particular, it is most suitable if the friction wheel be made of the same material as the brake linings of the particular vehicle in which it is installed.

An increase in the useful service life of the signaling device and, more particularly, the maintenance of its bearings as well as its electric current conducting slip rings and brushes, if it has any, is effected, in accordance with a particular feature of the present invention, by providing position control means by which the friction wheel may be automatically lowered against the friction surface of the brake when the brake is actuated and thereafter raised. The signaling device is therefore made operative only during the time when the vehicle is braked.

To assist in the raising and lowering of the friction wheel, the friction wheel support, in which the friction wheel is rotatably mounted, is made to swivel about an axis parallel to the axis of rotation of the friction wheel. The friction wheel support is normally part of the signaling device housing itself. The swivel axle is arranged next to and approximately perpendicular to the axle of the vehicle wheel; it is rigidly mounted so that its position remains unchanging with respect to the wheel axle casing.

The position control means is designed to include at least one spring that is arranged to pass the position-changing actuating force to the friction wheel support. The spring alone thus determines the force with which the friction wheel leans against the friction surface of the brake; that is, this force is made independent of the actuating force.

The actuating force causing the friction wheel to be raised and lowered can be produced in a number of ways. One suitable way is to use an expandable hollow element, such as a cylinder with a piston, which receives the pressure of the brake fluid or medium. An electromagnet, which is switchable independently of the brake pressure or the brake pedal position, can also serve to provide the actuating force. The position control means can even be directly mechanically coupled with the wheel brake cylinder or with the wheel brake linings so that it moves the friction wheel when the former are made to move.

Another important feature of the arrangement according to the present invention is a friction wheel wiper which is arranged on the friction wheel support means to lie with a light spring force against the circumference of the friction wheel. This wiper is preferably situated on the friction wheel at a position directly in front of the point of contact between the wheel and the friction surface of the brake assembly, such that when the vehicle wheel is traveling in the forward direction, the circumference of the friction wheel first passes the wiper before coming in contact with the friction surface. The wiper thus serves to remove particles of dirt which might become attached to the friction wheel. To this end the wiper is provided with a V-shaped or snowplow-like form, the point of which is located in the center of the friction wheel rim.

As a favorable side effect, the wiper, according to the present invention, also serves to maintain circular the circumference or rim of the friction wheel. The wiper can quickly smooth and round off any point of the friction wheel which has been softened and flattened during the operation as a result, for example, of an excess heating of the brake friction surface.

In one type of brake control system, described in the copending application referred to above, the signaling device not only actuates when the wheel to be braked exceeds a threshold of rotational deceleration, but also acts, in dependence upon rotational acceleration, to maintain the instantaneous brake pressure at a constant or throttle the pressure in such a way that it can increase only slowly. Not only can the present invention be adapted for use with such a signaling device, but it also affords some particular advantages in this type of brake control system.

When a vehicle employing this type of control system is braked and the friction wheel laid against the friction surface of the brake assembly, a short amount of time will be required before the friction wheel is brought up to speed. During this time, the acceleration contact of the signaling device will naturally close and prevent the braking pressure from further increasing to a value effective for braking the vehicle. It should be noted however that by the time the frictional wheel comes in contact with the friction surface of the brake, the brake linings will already be under a so-called "contact pressure"; that is, they will already lie lightly against the friction surface but produce no detetctable braking effect. In this condition the brake linings first clean the braking surfaces so that, after the signaling means has finally come to speed and allows the brake pressure to increase, all the various brakes of the vehicle will uniformly "pull." The small delay caused in the application of the full braking force is negligible or is at least far outweighed by the advantage of a uniform braking effect on all the wheels of the vehicle. Indeed skilled drivers of motor vehicles which employ disc brakes also will momentarily lightly touch the brake pedal before applying the full braking force in order to clean the discs. This "trick" is effectively automatically imitated by the friction wheel and position control mechanism, according to the present invention, and the brake control system of the type mentioned above.

DESCRIPTION OF THE PREFERRED EMBODIMENTS

Figure 1:
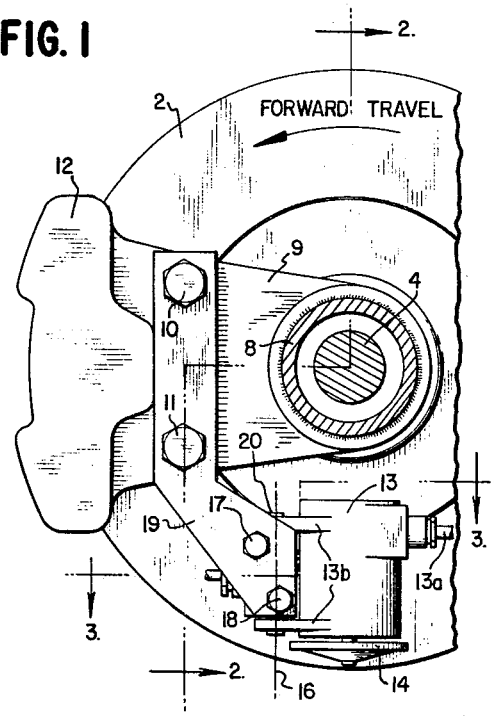
FIGURE 1 is an elevational view of the inner side of a brake disc assembly having attached thereto a signaling device according to a preferred embodiment of the present invention.
Figure 2:
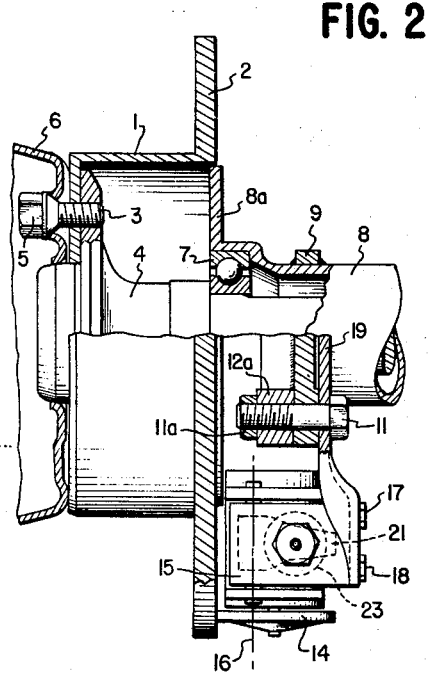
FIGURE 2 is a cross-sectional view of the arrangement of FIGURE 1 take along the line 2—2.

Referring now to the drawings, there is shown in FIGURES 1, 2, 3 and 4 various views of a preferred embodiment of the present invention attached to a disc-type brake assembly. The brake disc 1 of the brake assembly is shown in the cross section illustrated in FIGURE 2 to be actually a hat-shaped member having the braking surface 2 formed by the brim of the hat. The top of the hat is fastened to the flanged end of the wheel axle 4 by means of stud bolts 3. A wheel felly 6 is also mounted on the outside of the brake disc and held down with cap nuts 5. The wheel axle is supported in a tubular wheel axle housing 8 by means of a ball bearing 7. The axle housing or sleeve exhibits a flange-like extension 8a in the area of the ball bearing which seals off the internal portion of the brake disc hat to prevent dirt from entering.

A saddle support 9 is also provided; this support has an eye surrounding and welded to the wheel axle casing 8. Two bolts 10 and 11 fasten a brake saddle 12 to the saddle support 9. The brake saddle contains two wheel brake cylinders which press brake linings from both sides of the brake disc against the brake friction surfaces. The lower mounting bracket 12a of the brake saddle and the nut 11a of the mounting bolt 11 may be seen in cross section in the lower part of FIGURE 2.

The housing or casing of the electrical signaling device, according to the present invention, is designated with the number 13. A small axle which carries a friction wheel 14 projects downward from the signaling device housing; a flexible electrical cable which carries the signal away from the signaling device is connected to the housing 13 at the terminal 13a. The housing is rotatably mounted to a box-shaped position control housing 15 by means of two eyes 13b and a pin 20. The swivel axis is denoted in FIGURES 1 and 2 by the line 16. The position control housing is, in turn, connected to a shackle 19 with bolts 17 and 18. The shackle 19 is fastened, together with the brake saddle, to the saddle support 9. The shackle is provided with two holes having the same separation as the mounting bolts 10 and 11 so that it may be easily clamped in place.

Figure 3:
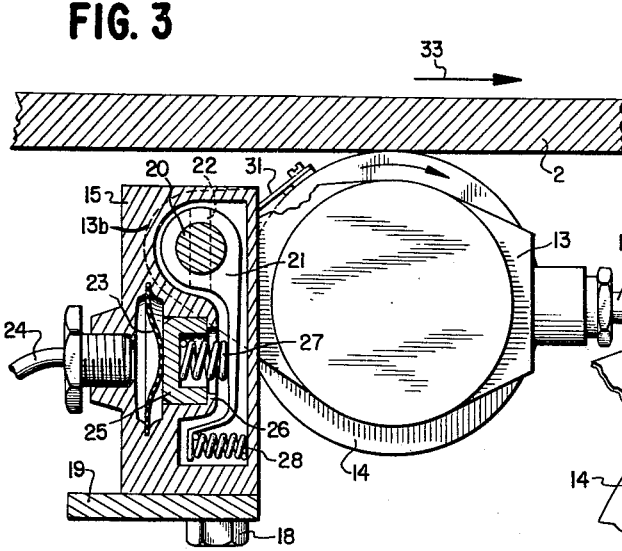
FIGURE 3 is an enlarged cross-sectional view of a portion of the arrangement of FIGURE 1 taken along the line 3—3.

As is shown in detail in FIGURE 3, a lever 21 is arranged inside the position control housing and fastened to the pin 20 by a cross pin 22. The pin 20 is rigidly mounted in the eyes 13b of the housing of the signaling device. A diaphragm 23, arranged to sense the pressure of the brake fluid, is also located in the position control housing. The space to the left of the diaphragm in FIGURE 3 is connected to the main brake pressure line by means of tubing 24. The opposite side of the diaphragm is in contact with a plunger or piston 25 which is limited in its movement toward the right by a constriction 26 in the housing which acts as a limit stop. A strong pressure spring is arranged between the piston and the lever 21. A weaker pressure spring 28 providing reverse bias is inserted between the bent over end of the lever and the housing wall.

The position control device operates to press the friction wheel against the braking surface of the brake disc only when the brake is actuated. If, for example, the driver of the vehicle applies the brakes, the pressure of the brake fluid will arch the diaphragm toward the right. The piston 25 which is pressed against the diaphragm by the spring 27 will likewise be displaced toward the right as far as the limit stop. The spring 27, which is stronger than the spring 28 will then operate to swivel the housing 13 of the signaling device about its axis 16 such that the friction wheel 14 comes in contact with the braking surface and turns at a speed corresponding to the speed of the brake disc. When the braking process is completed and the pressure of the brake fluid drops, the diaphragm 23 will be restored to its normal configuration. The pressure spring 27 is allowed to expand, as a result, and pushes the piston 25 toward the left. This permits the restoring spring 28 to expand and swivel the lever 21 as far as possible toward the left and raise the friction wheel off of the braking surface.

Figure 4:
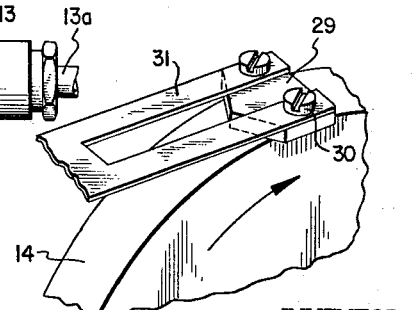
FIGURE 4 is an enlarged perspective view of a portion of the arrangement of FIGURE 1 showing the rim of the friction wheel and the rim wiper.

FIGURE 4 illustrates a small wiper plate 29 having a snowplow-like shape which is fastened with screws 30 to a forked flat spring 31. The arrangement of this wiper plate with respect to the direction of rotation of the friction wheel is best seen in FIGURE 3 where the arrows 32 and 33 indicate the direction of rotation of the friction wheel and the brake disc, respectively. The flat spring 31 which carries the wiper plate is fastened to the pin 20 or to the eye 13b of the housing of the signaling device which is closest to the friction wheel.

I claim:

1. In apparatus for regulating the braking force applied in a brake assembly of a wheel of a vehicle in response to the condition of rotational motion of such wheel, said brake assembly including a brake lining and a friction surface which comes in contact with said brake lining when said brake assembly is in its operative state, said apparatus having signaling means for sensing such condition of motion, the improvement wherein said signaling means includes a friction wheel arranged to roll upon a portion of said friction surface for sensing the motion of said friction surface and a position control means for lowering said friction wheel against said surface when said braking force is applied and for raising said friction wheel off of said surface when said braking force is not applied.

2. The improvement defined in claim 1 wherein said signaling means produces an electrical output signal in response to said condition of motion.

3. The improvement defined in claim 1 wherein said signaling means further includes means for rotatably supporting said friction wheel, said supporting means being mounted so as to swivel about an axis which is parallel to the axis of rotation of said friction wheel.

4. The improvement defined in claim 3 wherein said signaling means includes a housing which forms said supporting means.

5. The improvement defined in claim 1 wherein said signaling means further includes means for rotatably supporting said friction wheel and said position control means includes means producing a force for lowering said friction wheel and spring means, disposed between said force producing means and said supporting means for transmitting said force from said force producing means to said supporting means.

6. The improvement defined in claim 5 wherein said force producing means includes a brake medium-actuated, expandable hollow body.

7. In apparatus for regulating the braking force applied in a brake assembly of a wheel of a vehicle in response to the condition of rotational motion of such wheel, said brake assembly including a brake lining and a friction surface which comes in contact with said brake lining when said brake assembly is in its operative state, said apparatus having signaling means for sensing such condition of motion, the improvement wherein said signaling means includes a friction wheel arranged to roll upon a portion of said friction surface for sensing the motion of said friction surface, and means for wiping the circumferential edge of said friction wheel.

8. The improvement defined in claim 7 wherein said wiping means includes a wiper pad and means, supporting said wiper pad, for maintaining said wiper pad against the circumference of said friction wheel under a slight spring force.

9. The improvement defined in claim 8 wherein said wiper pad supporting means maintains said wiper pad in a position on said circumference immediately in advance, with respect to the forward rotational direction, of the point of contact between said friction wheel and said friction surface.

10. The improvement defined in claim 8 wherein said wiper pad has at least one edge having a convex-V shape, and said wiper pad is arranged such that said convex-V is effective, in the manner of a snowplow, to remove debris from the circumferential edge of said friction wheel.

11. The improvement defined in claim 1 wherein at least the circumferential edge of said friction wheel is made of a brake lining material.

12. The improvement defined in claim 11 wherein said friction wheel is made, in its entirety, of a brake lining material.

References Cited

UNITED STATES PATENTS

| | | | |
|---|---|---|---|
| 910,898 | 1/1909 | Bonbright | 324—70 X |
| 3,046,060 | 7/1962 | Stager et al. | 303—21 |

DUANE A. REGER, Primary Examiner

U.S. Cl. X.R.

73—518; 324—70